& nbsp;

2,883,436
HYDROHALOGENATION OF MONO HALOGENATED ALKANES

Le Roi E. Hutchings, Crystal Lake, Ill., assignor to The Pure Oil Company, Chicago, Ill., a corporation of Ohio No Drawing. Application July 28, 1955
Serial No. 525,066

10 Claims. (Cl. 260—658)

This invention relates to a process for preparing polyhalogenated hydrocarbons and for the preparation of diolefins from normally liquid hydrocarbons.

The preparation of diolefins from dihalobutanes such as 1,2-dichlorobutane, 2,3-dichlorobutane, 1,3-dichlorobutane, 1,4-dichlorobutane and from higher molecular weight homologs thereof, such as 2,3-dichloro-2-methyl butane and 1,3-dichloro-2-ethyl butane by dehydrohalogenation is well known as taught in the patent to Groll et al., No. 2,310,523. The preparation of higher molecular weight diolefins by chlorination of petroleum fractions and dehydrochlorination thereof is taught in Brooks et al., Patent No. 1,220,821, and the preparation of diolefins from dichlorinated and dibrominated paraffins is taught in Webel, Patent No. 1,026,418. The diolefins are useful in the manufacture of synthetic elastomers, as drying oil substitutes, in the preparation of hydric alcohols by reacting with hydrogen cyanide and then hydrolyzing with aqueous caustic soda, and for various other purposes.

An object of this invention is to provide a method for preparing polyhalogenated paraffinic hydrocarbons.

Another object of the invention is to provide a method for preparing polychlorinated hydrocarbons.

Still another object of the invention is to provide a method for preparing polyhalogenated hydrocarbons from normally liquid aliphatic hydrocarbons.

A further object of the invention is to provide a method for preparing normally liquid diolefins from normally liquid or solid paraffinic or olefinic hydrocarbons.

Other objects of the invention will become apparent from the following description.

I have discovered that mono-hydrohalogenated paraffin hydrocarbons can be further hydrohalogenated by subjecting the mono-hydrohalogenated hydrocarbons to heating at a controlled cracking temperature in the presence of a hydrogen halide atmosphere under high super-atmospheric pressure and that the resulting product can be dehydrohalogenated in any suitable manner known for dehydrohalogenating dihalogenated paraffinic hydrocarbons to diolefins to obtain a high yield of primary diolefins.

In carrying out my invention I start with a high molecular weight petroleum fraction as, for example, paraffin wax containing hydrocarbons with approximately 18 to 36 carbon atoms per molecule or with other suitable, high molecular weight, predominantly paraffinic petroleum fractions. The paraffinic material is subjected to cracking at temperatures of approximately 610 to 630° F., preferably at atmospheric pressure, in order to split the molecules without excessive formation of gas and coke. The product from the initial cracking will contain a fairly high concentration of monoolefinic hydrocarbons with an average molecular weight about half that of the starting material. Cracking may be effected in a batch still operation in which case the cracked products will be taken off overhead as vapors and condensed; or the cracking may be effected in a continuous or semi-continuous operation in which case preheated wax is continuously or intermittently fed to the charge in the still and cracked vapors continuously withdrawn. The unvaporized liquid may be recycled through a heating zone and back to the vaporizing zone. Suitable methods for mildly cracking wax within the aforesaid temperature range will be apparent to those skilled in the art.

The liquid cracked product, which will have an average molecular weight of approximately half that of the starting material, is then hydrohalogenated in any known manner, as for example, by reacting the product with hydrogen chloride or hydrogen bromide at temperatures of about 20–80° C. using a zinc halide-oil mixture or concentrated aqueous zinc halide catalyst as disclosed in Patent No. 2,705,734. Low temperature hydrohalogenation is preferred in order to avoid further decomposition of the cracked stock.

The monohydrohalogenated product may be either directly subjected to a further hydrohalogenation step as hereafter set forth or it may be first fractionated to separate the halogenated product from the unconverted paraffinic hydrocarbons. Fractionation can be readily effected under sub-atmospheric pressure with or without steam because of the difference in the boiling points of the paraffinic hydrocarbons and the hydrohalogenated olefins. Another method for separating hydrohalogenated hydrocarbons from the unconverted paraffins is to treat the mixture with synthetic calcium alumino-silicate zeolite, the pores of which have a diameter of 5 Angstrom units. The paraffinic hydrocarbons are selectively adsorbed in the pores of the zeolite and can be removed therefrom by steam stripping at temperatures below about 300° C. The paraffins can be disposed of in any suitable manner. If desired, they can be cracked in a separate unit to produce lighter olefins which in turn can be hydrohalogenated and dehydrohalogenated to produce lower molecular weight diolefins than those produced from the initial cracking operation.

The monohalogenated product, either with or without separation of the unconverted paraffins, is subjected to a second, carefully controlled differential thermal cracking step at a temperature of about 600–650° F. in the same manner as the wax initially cracked except that cracking is carried out in a hydrogen halide atmosphere under pressure of 1000 to 5000 p.s.i.g. The hydrogen halide is present in large excess over that required to hydrohalogenate any olefins formed. For example, from 50 to 150 moles of hydrogen halide per mole of hydrochlorinated mixture may be used and the mixture is maintained under reaction conditions for a sufficient period of time to bring about a substantial amount of cracking and hydrohalogenation, namely, about five hours. The time will vary somewhat depending on the charge and reaction conditions. Under these conditions, cracking and hydrohalogenation of the product occur while dehydrohalogenation is suppressed. The reactions which take place during this step may be exemplified as follows:

(1) $H_3C-(CH_2)_9 \cdot CHCl \cdot CH_3 + HCl \rightarrow$
 $H_3C \cdot (CH_2)_4 \cdot CH_3 + H_3C \cdot CHCl \cdot (CH_2)_2 \cdot CHCl \cdot CH_3$ (2) $H_3C \cdot (CH_2)_9 \cdot CHCl \cdot CH_3 + HCl \rightarrow$
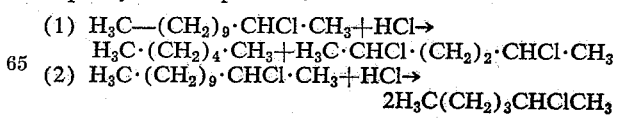

In the second hydrohalogenation step, in addition to the dihalogenated paraffinic hydrocarbons and lower molecular weight monohalogenated paraffins, some gas and coke are formed.

The liquid reaction product recovered from the second halogenation step is subjected to dehydrohalogenation in any known manner, as for example, by contacting the product with activated alumina or bleaching clay at about 250° C. under sub-atmospheric pressure; or by passing the product through a heated tube in the absence of a catalyst at temperatures between 250–750° C. as disclosed in Patents Nos. 2,310,523 and 2,389,231; or by passing the product over barium chloride at temperatures of 300–550° C. in the manner disclosed in Patents Nos. 1,026,418 and 1,220,821. The reactions which take place in the dehydrohalogenation step may be exemplified as follows:

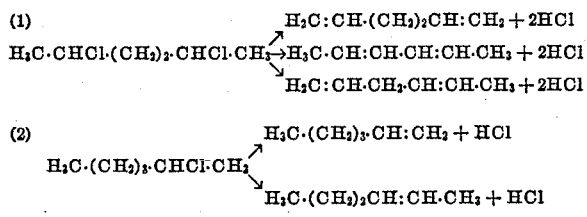

One of the principal products of the dehydrohalogenation is the formation of primary diolefins, that is, diolefins in which the double bonds occur between the first and second carbon atoms at the ends of the chain. The product can be freed of hydrogen halide, if necessary, by water washing after which the diolefins may be separated from the reaction mixture by any known method, such as by extraction with ethylene glycol or other suitable solvent in the manner set forth in Patent No. 2,371,817 or extraction with sulfur dioxide as in Patent No. 2,436,149.

It may be desirable, particularly if separation of the hydrohalogenated product from unconverted paraffins is not effected after the hydrohalogenation step, to separate unconverted paraffins from the hydrohalogenated product after the second hydrohalogenation step by vacuum distillation with or without steam in order to avoid the difficulties inherent in separating diolefins from paraffins of similar boiling points.

It will be evident that the hydrogen halide produced in the dehydrohalogenation step can be recovered in the dry state or in aqueous solution and continuously recycled to both hydrohalogenation steps.

The following is a specific example illustrating the process: One hundred pounds of paraffin wax having an average molecular weight of 340 is thermally cracked without catalyst at atmospheric pressure and 620° F. in a batch still to yield 80 pounds of overhead product containing 40 pounds of paraffins and 40 pounds of olefins having an average molecular weight of 170. There is also produced 20 pounds of gas and coke. The liquid paraffin-olefin mixture (80 pounds) is then hydrochlorinated with 9 pounds of hydrogen chloride in solution in a 70% aqueous zinc chloride solution at room temperature and atmospheric pressure by intensive stirring for approximately 2 hours. About 200% of zinc chloride solution is used based on the weight of the olefins. Eighty nine pounds of product is obtained containing 49 pounds of monohalogenated paraffins, the balance being paraffins. This mixture is cracked in a tubular-type thermal cracking unit at 640° F. and 2000 p.s.i.g. in the presence of hydrogen chloride which is charged at a rate such that the hydrogen chloride is present in the reaction mixture in an amount of approximately 100 moles per mole of the hydrochlorinated mixture. The residence time of the liquid in the cracking-hydrohalogenation zone is 5 hours. There results from this operation a liquid product containing 15 pounds of paraffins with an average molecular weight of 85, 46 pounds of monochlorinated paraffins having an average molecular weight of 120, and 33 pounds of dichlorinated paraffins with an average molecular weight of 155. There is also produced 14 pounds of carbon and gas. Nineteen pounds of hydrogen chloride are consumed in the reaction. The liquid reaction mixture, without fractionation, is then dehydrohalogenated at 250° C. by contact with bleaching clay to produce 28 pounds of hydrogen chloride, 18 pounds of diolefins, 32 pounds of monoolefins and 15 pounds of paraffins. Of the total diolefins, approximately 5 pounds are primary olefins.

The diolefins are purified by extracting 65 pounds of liquid reaction product with 180 pounds of diethylene glycol in a countercurrent extraction tower using overhead from the tower for refluxing at the top. There is recovered from the extraction system 18 pounds of 95% pure diolefins, the remaining 5% consisting of monoolefins. The raffinate from the reaction system is composed of 15 pounds of paraffins and 31 pounds of monoolefins.

The resulting monoolefins, although having an average molecular weight somewhat lower than the monoolefins contained in the initially cracked product, are of sufficiently high molecular weight so that they can be recycled for admixture with the initially cracked product to make additional quantities of diolefins; or these monoolefins may be subjected to a separate series of steps involving hydrohalogenation, cracking-hydrohalogenation, and dehydrohalogenation as above set forth in connection with the initially cracked stock in order to make additional quantities of liquid diolefins of lower molecular weight and boiling range than those produced from the initial stock.

Although hydrogen chloride is used in the specific example, other hydrogen halides, particularly hydrogen bromide may be used in place thereof. In the event other hydrogen halides are used and hydrohalogenation of the paraffin-olefin mixture is carried out in the manner set forth in the specific example, instead of using zinc chloride as catalyst, a zinc halide should be used corresponding to the hydrogen halide.

It will be seen, therefore, that I have devised an economical process for preparing higher molecular weight diolefins.

I claim:

1. A method of hydrohalogenating monohalogenated saturated alkyl hydrocarbons, comprising subjecting said monohalogenated hydrocarbons to mild cracking temperature in the presence of a large molar excess of a hydrogen halide, said hydrogen halide being maintained at a pressure of 1000 to 5000 p.s.i.g.

2. Method in accordance with claim 1 in which the hydrogen halide is hydrogen chloride.

3. Method in accordance with claim 2 in which the temperature is about 600–650° F.

4. Method in accordance with claim 3 in which the monohalogenated hydrocarbon contains an average of about 12 carbon atoms per molecule.

5. Method in accordance with claim 4 in which the hydrogen chloride is present in an amount of 50 to 150 moles per mole of monochlorinated alkanes.

6. The method of preparing diolefins which comprises hydrohalogenating olefinic hydrocarbons to form saturated monohalogenated alkanes, subjecting said monohalogenated alkanes to mild cracking temperature in the presence of a large molar excess of a hydrogen halide maintained at a pressure of 1000–5000 p.s.i.g., for a period of time sufficient to form dihalogenated alkanes, dehydrohalogenating said dihalogenated alkanes to produce diolefins and hydrogen halide, and recycling the hydrogen halide to the hydrohalogenation steps.

7. Method in accordance with claim 6 in which said olefinic hydrocarbons are prepared by cracking paraffin wax under mild cracking conditions.

8. Method in accordance with claim 7 in which hydrogen chloride is used to hydrohalogenate the olefinic hydrocarbons and to form dihalogenated alkanes.

9. Method in accordance with claim 8 in which the monochlorinated alkanes are subjected to mild cracking at about 600–650° F.

10. Method in accordance with claim 9 in which the product containing the dichlorinated alkanes is fractionated to eliminate unchlorinated compounds prior to dehydrochlorination.

References Cited in the file of this patent

UNITED STATES PATENTS

| | | |
|---|---|---|
| 1,806,618 | Egloff | May 26, 1931 |
| 2,105,733 | Hass et al. | Jan. 18, 1938 |
| 2,315,871 | Oberfell et al. | Apr. 6, 1943 |
| 2,389,230 | Blumer | Nov. 20, 1945 |
| 2,674,633 | Reitlinger | Apr. 6, 1954 |
| 2,741,642 | Wiese | Apr. 10, 1956 |
| 2,768,225 | Moore | Oct. 23, 1956 |